(12) United States Patent
Macek et al.

(10) Patent No.: US 9,645,563 B2
(45) Date of Patent: May 9, 2017

(54) TUNING MODEL STRUCTURES OF DYNAMIC SYSTEMS

(75) Inventors: Karel Macek, Prague (CZ); Karel Marik, Revnice (CZ)

(73) Assignee: Honeywell International Inc., Morris Plains, NJ (US)

( * ) Notice: Subject to any disclaimer, the term of this patent is extended or adjusted under 35 U.S.C. 154(b) by 629 days.

(21) Appl. No.: 13/599,712

(22) Filed: Aug. 30, 2012

(65) Prior Publication Data
US 2014/0067088 A1  Mar. 6, 2014

(51) Int. Cl.
G05B 13/02    (2006.01)
G05B 17/02    (2006.01)

(52) U.S. Cl.
CPC ..................... *G05B 17/02* (2013.01)

(58) Field of Classification Search
CPC ...................................................... G05B 13/02
USPC ............................................ 700/31, 30, 276
See application file for complete search history.

(56) References Cited

U.S. PATENT DOCUMENTS

2010/0152905 A1\*  6/2010  Kusiak .......................... 700/276
2012/0232969 A1\*  9/2012  Fadell .................... G06Q 10/20
                                                                    705/14.4

\* cited by examiner

*Primary Examiner* — Tejal Gami
(74) *Attorney, Agent, or Firm* — Brooks, Cameron & Huebsch, PLLC

(57) ABSTRACT

Tuning model structures of dynamic systems are described herein. One method for tuning model structures of a dynamic system includes predicting a variable for each of a number of models associated with a number of model structures of a dynamic system, calculating a rate of error of the predicted variable for each of the number of models compared to an observed variable, determining a best model structure among the number of model structures based on the calculated rate of error, and creating a revised model structure using the best model structure to tune the number of model structures of the dynamic system.

18 Claims, 5 Drawing Sheets

TUNING MODEL STRUCTURES OF DYNAMIC SYSTEMS

TECHNICAL FIELD

The present disclosure relates to tuning model structures of a dynamic system.

BACKGROUND

Model structures of a dynamic system can refer to statistical modeling of a dynamic system using measured data (e.g., data associated with the components, equipment, and/or properties of a dynamic system). For example, a dynamic system can include a heating, ventilation, and air-conditioning (HVAC) system, a building and/or a manufacturing system.

DETAILED DESCRIPTION

Figure 1:
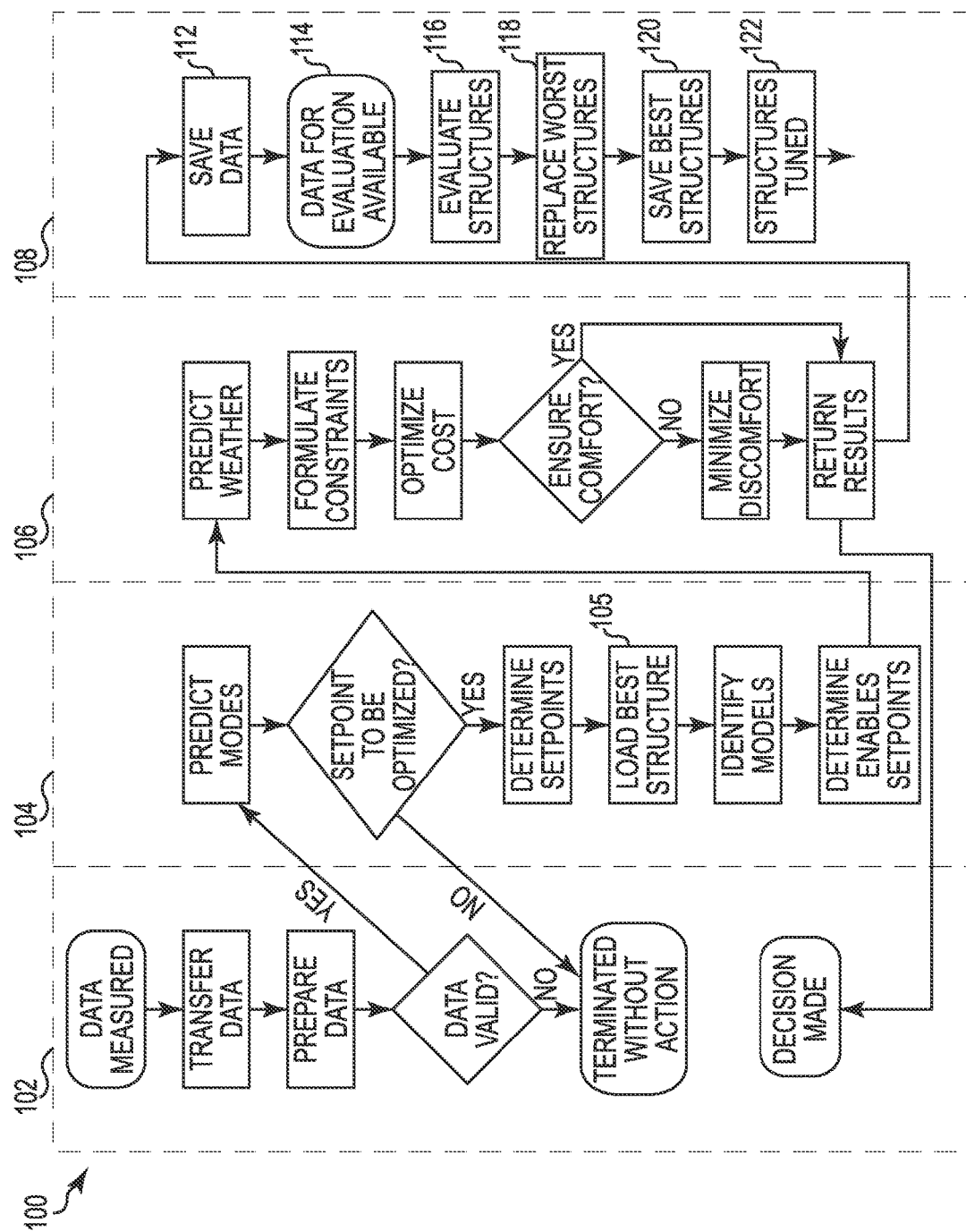
FIG. 1 illustrates a method for a system supervisory control including tuning model structures of a dynamic system in accordance with one or more embodiments of the present disclosure.

Embodiments of the present disclosure include tuning a model structure for a dynamic system. Tuning model structures of a dynamic system can include remotely monitoring the dynamic system to install setup parameters of the model structure.

Model structures and associated models can be used for system supervisory control. System supervisory control can include control of individual controllers and/or control loops by a human and/or automatic control system. For instance, system supervisory control can be used for overall optimization of a system.

For example, a dynamic system, such as a HVAC system, can include a system with a number of controlled machines (e.g., equipment) and/or processes that continue autonomously. A human can, from time to time, observe the dynamic system and determine that a control algorithm needs to be modified in some way. Modifying the control algorithm can include making changes to a model structure and/or associated model of the dynamic system.

Accurately setting up a model structure and an associated model of a dynamic system can, for example, result in lower cost of running the dynamic system compared to inaccurate set up. Optimizing a setting of the parameters of a model can depend on a structure of a building, equipment, and/or properties associated with the dynamic system, as well as the quality of available data.

A model structure can include a definition of variables used for modeling. For example, a model structure can include information regarding dependencies between variables in a model. These dependencies can be twofold: (i) existence of linear dependency (e.g., FIGS. 2A-2B) and/or (ii) bandwidth for local regression (e.g., FIG. 2C).

A model can include predictive modeling of variables of a dynamic system based on observed past values of the variables. A model can be formed using parameter estimation applied to a model structure and the observed past values of the variables (e.g., measured data).

In some instances, variables of a dynamic system, such as a HVAC system, can be difficult to model because of inadequate documentation and human behavior. Example variables of a dynamic system can include inputs into the dynamic system, outputs of the dynamic system, energy consumption of the dynamic system, and states of the dynamic system, among many other variables. For modeling purposes, focus can be on state variables (e.g., zone temperature) and output variables (e.g., a related energy cost).

For instance, model predictive control of a HVAC system can depend on a number of parameters of a model. The number of parameters can include discrete parameters (e.g., a model structure) and continuous parameters (e.g., locality of data, robust regression parameters, and regularized regression parameters).

Manual installation of setup parameters, including a model structure of the model, may be used to optimize a dynamic system. However, manual installation of setup parameters can affect deployment cost and/or can impact overall profits.

In contrast, tuning model structures of dynamic systems in accordance with one or more embodiments of the present disclosure may include tuning a population of candidate model structures by remotely monitoring a dynamic system (e.g., monitoring data using the Internet). For instance, tuning a population of candidate model structures can include updating a population of model structures eligible to be a best model structure. A best model structure can, for instance, include a model structure among the population with a lowest rate of error and can be used for system supervisory control.

Tuning a model structure of a dynamic system by remotely monitoring the dynamic system can reduce a cost of installing setup parameters and/or can reduce maintenance cost as compared to manually setting up the parameters.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of objects" can refer to one or more objects. Additionally, the designator "L", "N", "P", and "Q" as used herein, particularly with respect to reference numerals in the drawings, indicate that a number of the particular feature so designated can be included with a number of embodiments of the present disclosure.

FIG. 1 illustrates a method 100 for a system supervisory control including tuning model structures 108 in accordance with one or more embodiments of the present disclosure. A dynamic system can include a HVAC system, a building system, and/or a manufacturing system, among suitable other dynamic systems that would benefit from tuning a model structure.

System supervisory control can include control of individual controllers and/or control loops by an automatic control system. For example, a dynamic system, such as a HVAC system, can have a number of controlled machines (e.g., equipment) or processes that continue autonomously. For instance, the system supervisory control can control a dynamic system using a control algorithm. A control algorithm can be determined and/or optimized using a model of the dynamic system.

As an example, using system supervisory control, a HVAC system can be optimized for cost. For instance, if a zone of a building is set to be 25 degrees Celsius (C), a method for system supervisory control can include optimizing cost associated with the HVAC system while maintaining the desired temperature in the zone. Optimizing cost associated with the HVAC system can, for example, include optimizing control variables associated with the controlled machines and/or processes of the HVAC system using a control algorithm.

One type of method for a system supervisory control, as illustrated in FIG. 1, can include a method for managing data 102, a method for identifying models 104, and a method for optimizing a dynamic system 106. The managed data from the method for managing data 102 can be used for identifying models. For instance, using the managed data, a model structure can be identified and an associated model can be identified and/or created using the model structure. The model identified and/or created in the method for identifying models 104, can be used in the method to optimize the dynamic system 106, for example.

The method for managing data 102 can, for instance, include measuring data, transferring the data, preparing the received data, and determining whether the data is valid. In response to the data being invalid, the data can be terminated without action.

In response to the data being valid, the method for identifying models 104 can begin. A model can be identified by identifying a number of model parameters in data. Model parameters can include can include discrete parameters (e.g., a model structure) and continuous parameters (e.g., locality of data, robust regression parameters, and regularized regression parameters). For instance, a model structure can include information regarding existence of linear dependency between variables of a dynamic system (e.g., FIGS. 2A-2B) and/or bandwidth for local regression (e.g., FIG. 2C).

A model, as used herein, can include a number of model parameters estimated (e.g., regression coefficients estimated) and associated with a number of input variables. The model can be determined and/or identified by using parameter estimation applied to a model structure and measured data to determine the number of regression coefficients.

For instance, a model can result in a prediction of a number variables of a dynamic system (e.g., values of variables with a linear dependency) based on estimated model parameters (e.g., regression coefficients) associated with particular input variables and recently measured data.

Examples of models can include a model of a cost of running a dynamic system, model of dynamics of the dynamic systems, and/or a model of comfort associated with the dynamic system (e.g., comfort of a number of people in a building), for instance. For example, a dynamic model can describe an evolution of the dynamic system over time. A cost model can calculate costs related to a particular state and/or operation of the dynamic system. The dynamic model and the cost model can be interconnected in that the evolution of the dynamic system can have related costs.

As used herein, a model structure can include a relationship between a number of variables in a dynamic system. For example, a model structure can be used to determine which model parameters are to be estimated using measured data. A model structure can include the used variables, the order of the used variables, and local bandwidths (e.g., model structure parameters).

For instance, a used variable can include a variable among the number of variables in a dynamic system that impacts a critical variable. A critical variable can include a variable that is important for supervisory control performance. A critical variable can include cost of running the dynamic system, dynamics of the dynamic system, and/or comfort associated with the dynamic system (e.g., comfort of a number of people in a building), for instance. For example, if it is important to minimize energy consumption in a dynamic system, gas consumption and/or electricity consumption can be critical for supervisory control performance and, therefore, their variables would be considered as critical variables.

The order of the used variables can, for instance, include a number of observations to be made for a used variable. For example, the order of the used variables can include a number of recent observations to be made for a used variable. As an example, a used variable x can have an order of two for a critical variable y. An order of two for variable x can indicate that two observations are to be made for variable x in a model relating to critical variable y. The two observations, for instance, can include observations at two time intervals (e.g., observations made at two time instances).

A local bandwidth can include a definition of what data to use for a variable. For instance, a local bandwidth can include a time of day and observations for a variable in a model associated with the model structure can all be made at the time of day for multiple observations (e.g., at nine a.m. each observation saved). A local bandwidth can include a narrow bandwidth (e.g., specific definition of data) or a broad bandwidth (e.g., not specific definition of data).

For example, a narrow bandwidth can include a definition of data to use for a variable that includes multiple limitations, such as a time of day, weather restrictions, date restrictions, and observed patterns of data, among other limitations. An example narrow bandwidth can include 9 a.m., less than 20 degrees Celsius (C) outside, on a Monday, and the observed data has a specified pattern.

For example, in the embodiments of FIG. 1, the method 104 can include predicting modes from the data and determining if any setpoints are to be optimized. A setpoint, as used herein, can include a controlled variable that can be set up by the supervisory controller. A setpoint can include a desired outcome of 106. For instance, a setpoint can include a temperature in a room of 21 C and to reach the setpoint a level of heating and/or cooling may need to be changed. A lower level controller can ensure a setpoint will be achieved (e.g., a thermostat). If no setpoints are to be optimized, the data can be terminated without action.

Modes can include a variable that indicates a status of a device and/or equipment. For example, a mode can include enable and/or disabled. A disabled mode can include an indication a device and/or equipment is not activated, functional, and/or not in the dynamic system. An enabled mode can include an indication that a device and/or equipment is operational, activated, and/or in the dynamic system. The modes can represent important information that assists to determine a setpoint. For instance, if a zone is unoccupied, the internal temperature of the zone can be omitted.

If setpoints are to be optimized, the setpoints can be determined and, at block 105, a best model structure can be loaded. A best model structure loaded 105, in accordance with various embodiments of the present disclosure, can include a best model structure from a method for tuning model structures 108. In response to loading the best model structure, a model can be identified and enabled setpoints can be determined. The model identified can include a model with estimated model parameters (e.g., regression coefficients) determined using the best model structure loaded and recently measured data (e.g., parameter estimation performed using the best model structure and recently measured data).

In response to determining enabled setpoints, the method for optimizing the dynamic system 106 can begin. The method for optimizing the dynamic system 106 (e.g., HVAC system) can include predicting weather forecast, formulating constraints, and optimizing cost. For example, optimizing a HVAC system can include optimization of HVAC system setpoints and cost.

In response to optimizing cost, a determination can be made as to whether comfort can be ensured. If comfort can be ensured, the results can be returned. If comfort cannot be ensured, the discomfort is minimized and the results can be returned. Returning the results can include solving the optimization and sending control signals back.

A method for a system supervisory control can include an overall optimization of the system. The model structures used by a method for the system supervisory control can be improved using a method for tuning model structures 108. The method for tuning model structures of a dynamic system 108 can result in improvement of performance of the dynamic system as compared to the method for system supervisory control.

Tuning model structures of a dynamic system 108 can include a portion of supervisory control, for instance. In accordance with one or more embodiments of the present disclosure, the method for tuning model structures of a dynamic system 108 can be performed adaptively using the Internet.

At block 112, the method for tuning model structures of a dynamic system 108 can include saving data for a number of model structures for an evaluation period. For instance, a best model structure can be used in a first optimization process (e.g., optimizing the dynamic system 106).

Data to identify the best model structure and the number of model structures can be saved for a future evaluation of the number of model structures. The data can, for instance, include a number of model parameters for the model identified in the method for system supervisory control. A best model structure for a second optimization process may be different then the best model structure for the first optimization process, for example.

At block 114, the method 108 can include determining if data for evaluation is available. For example, data for evaluation can include an observed variable of the dynamic system for a period of time, and/or a number of observed variables of the dynamic system for the period of time. A variable of a dynamic system, for instance, can include a parameter and/or variable of the dynamic system (e.g., inputs, outputs, and states of the dynamic system).

An observed variable can include observed values for a number of variables over a period of time. For example, an observed variable can include an observed independent variable x and an observed dependent variable y over a time period of one hour. A variable can be observed using a sensor associated with the variable to take a time-series of values and/or obtained by an action of an operator (e.g., resetting by an operator).

The data available to evaluate a number of model structures 114 can include a result of performance of the number of model structures saved for an evaluation period 112. For instance, data for a number of model structures for an evaluation period to be saved 112, and data available to evaluate the number of model structures 114 can occur simultaneous at each time period.

As an example, a first best model structure can be used at time period 1 (e.g., 12:00 p.m.). At time period 2 (e.g., 1:00 p.m.) data to evaluate the number of model structures including the first best model structure can be available, as well as, data for a number of model structures for a second time period of evaluation (e.g., 1:00 p.m.). For instance, several time instances, such as each 15 minutes, can be considered between 12:00 p.m. and 1:00 p.m. The application of model predictive control with a predictive horizon, in this case 4 time instances, can play a role.

At block 116, the method 108 can include evaluating the number of model structures. The number of model structures can include a population of a number of candidate model structures. A candidate model structure and/or a model structure in the population of model structures can include a model structure that is a candidate for being a best model structure.

In some examples of the present disclosure, evaluating the number of candidate model structures can include predicting a variable for each of a number of models associated with a candidate model structure and calculating a rate of error of the predicted variable for each of the number of candidate model structures compared to an observed variable.

In accordance with one or more embodiments of the present disclosure, evaluating a model structure can include calculating a predicted value for a number of variables in a model associated with the model structure over a period of time. The predicted value for each of the number of variables can be compared to an observed value for each of the number of variables over the period of time.

A rate of error for the model structure can be calculated by comparing the predicted values and the observed values. A predicted value for a number of variables can include a prediction of a value for an independent variable and/or dependent variable based upon a number of known variables. The predicted values can be predicted for a period of time (e.g., one hour).

For the predictions, model parameters may need to be estimated for each model structure of the number of model structures in 116 with respect to saved data 112 considered for a prediction situation in the past. For the estimations, the same procedure can be applied as 105. However, instead of only considering the best model structure 105, all model structures in the population of model structures are considered.

The evaluation is possible with this delay because after the delay, real data can be measured. Thereby, the error can be calculated using the real data.

A rate of error for a model structure can include an aggregated prediction error. The rate of error for a model structure, for instance, can be used to define a quality of a model structure. For example, a first model structure with a lower rate of error than a second model structure can include a better quality model structure than the second model structure. An example function for calculating rate of error $a_i$ can include:

$$a_i = \sum_{j=1}^{t_{eval}} \sum_{k=1}^{N_{var}} n_k \sum_{t=1}^{t_{max}} \gamma^t \rho\left(\frac{e_{j,k,t,i}}{r_k}\right)$$

$$\text{wherein } \sum_{t=1}^{t_{max}} \gamma^t \rho\left(\frac{e_{j,k,t,i}}{r_k}\right)$$

can determine the error of a model structure in a single evaluation. For instance, $t_{max}$ can represent a maximum time of an evaluation and t can represents a time period of each observation in an evaluation (e.g., four fifteen minute time periods in an evaluation time of one hour). The error of the model structure can be denoted by e. A function p can represent a function such as $\rho(\xi)=|\xi|$). The difference between the observed values of x and y, and predicted values of x and y based on the number of model structures μ, known inputs (e.g., u and d), and available data H can be denoted by $e_{j, k, t, i}$. For example, $e_{j, k, t, i}$ can equal $x_{k, j}-x_{k, j-t+1}$ (μ, H, d, u).

The calculated error e can be normalized for each variable by dividing the error e by a normalization r. Normalizing a variable, for instance, can include normalizing the error for each variable based on the range of the variable. For example, a first variable with a range of 0.0 to 1.0 with an error of 0.50 may indicate a worse error than that of a second variable with a range of 0.0 to 50.0 with an error of 0.50. $\gamma^t$ can include an importance of a next prediction to a variable.

In accordance with one or more embodiments of the present disclosure, sums by j=1 .... $t_{eval}$ and k=1 ... $N_{var}$ can determine the average sum error of a model structure including all variables of the model structure over a number of evaluations performed. Thereby, a rate of error for a model structure and/or a number of model structures can be updated over time based on a number of evaluations of the model structure and/or number of model structures. For instance, $t_{eval}$ can represent a number of evaluations performed on the model structure, and j can represent a time interval of an evaluation (e.g., 15 minutes and an hour). $N_{var}$ can represent a number of variables in the model structure, k can represent an index of variables, and $N_k$ can represent an importance of the variable.

An importance of a variable, as used herein, can include a priority of a variable. A priority of a variable, in accordance with some embodiments of the present disclosure, can be set by a user. A priority of a variable, for instance, can be received from a user. A user can include an owner of the building and/or an operator of the system supervisory control, for example. For example, a prioritization for a number of variables can be received from a user and the prioritization can be used to calculate the rate of error.

In accordance with some embodiments of the present disclosure, at block 118, the method 108 can include replacing a number of worst model structures among the number of model structures. A worst model structure can include a model structure with a higher calculated rate of error than the remaining number of model structures (e.g., the population of candidate model structures). A worst model structure can, for instance, be replaced with a revised model structure.

In various embodiments, a worst model structure can include a model structure with less then a threshold number of observed values, for example. A threshold number of observed values can, for instance, include a threshold number of evaluations of the model structure (e.g., $t_{eval}$). As an example, if a threshold number of evaluations is ten, a model structure with nine evaluations can include a worst model structure. A model structure with fewer evaluations than the threshold number of evaluations can also include an immature model structure, for example.

At block 120, the method 108 can include saving a best model structure. The method 108, in accordance with one or more embodiments of the present disclosure can include identifying and/or determining a best model structure among the number of model structures based on the calculated rate of error. A best model structure can include a model structure with a lowest calculated rate of error among the number of model structures. The saved best model structure, for example, can be used with recently measured data to produce a model with estimated model parameters (e.g., regression parameters).

In various embodiments of the present disclosure, a number of well performing model structures can be saved. The number of well performing model structures can include a population of model structures saved (e.g., candidate model structures). A well performing model structure can include a model structure with a lower calculated rate of error than the remaining number of model structures (e.g., worst model structures).

For instance, the number of well performing model structures can include a threshold number of model structures. A threshold can include a numerical number of well performing model structures (e.g., ten, a hundred, a thousand). For example, the number of well performing model structures can include the best model structure.

In some embodiments of the present disclosure, the parameters of the saved population of well performing model structures can be set. For instance, the parameters of the population of well performing model structures can be set by a user. The parameters can include a minimum number of evaluations $t_{eval}$ for a model structure to be mature, a maximum calculated rate of error $a_i$ and/or a size of the saved population of well performing model structures. A size of the saved population can include a threshold number of well performing model structures, a minimum number of well performing model structures and/or a maximum number of well performing model structures.

In various embodiments of the present disclosure, a number of immature model structures can be saved. For example, an immature model structure may be saved until the immature model structure becomes mature (e.g., reaches a threshold number of evaluations). The number of immature model structures, for instance, can be saved separately from the population of model structures.

The ratio of immature model structures in the population can be limited because the immature model structures cannot be replaced since they are not comparable with a mature model structure (e.g., have not been evaluated $t_{eval}$ times). The replacement rate (e.g., how many model structures may be replaced at each step of the supervisory control) may not be limited. For instance, only mature model structures can be denoted as the best model structure, saved at 122, and consequently used at 105.

At block 122, the method 108 can result in tuning the number of model structures of a dynamic system. For instance, tuning the number of model structures of a dynamic system can include the total method 108 including evaluating the population of model structures and saving the best model structure and/or well performing model structures. The method 108 can, for example, result in a collection of iteratively tuned model structures (e.g., population of candidate model structures).

In various examples of the present disclosure, the population of model structures can be updated with a revised model structure. The revised model structure can be created using the best model structure. For instance, updating the population of model structures can occur remotely through the Internet. Updating the population of model structures can include defining a new model structure. The revised model structure can include a model structure with a higher probability of being accurate than a randomly created model structure.

Creating a revised model structure can include migrating a model structure among the population of model structures and/or combining a plurality of model structures among the population of model structures. For instance, the best model structure can be migrated, a well performing model structure can be migrated towards the best model structure, and/or a random model structure can be migrated towards the best model structure.

A revised model structure can include a model structure with a lower calculated rate of error than the best model structure. The revised model structure and the model structure prior to being migrated (e.g. best model structure, well performing model structure, and random model structure) can be saved, for example.

For instance, a revised model structure can be created by constructing a statistical graph (surrogate model) of the results of the plurality of model structures. The revised model structure can be determined using historical variable values and observed values. For example, the graph can include the plurality of model structures $u_i$ on the x-axis and a number of calculated rates of errors a of the plurality of model structures $u_i$ on the y-axis based on the mean value and variance. The statistical result, for instance, can be based on a Gaussian process including mean value and variance. A new model structure can be created so that the improvement of the rate of error a is improved by $\epsilon$.

For example, if the statistical graph results in $\epsilon=0$, there may be no exploration. A small $\epsilon$ value can result in tuning focused on sure improvements. If the statistical graph results in $\epsilon=\infty$ there may be exploration regardless of the calculated rate of error a of the plurality model structures. A large $\epsilon$ value can result in tuning including exploring unknown areas.

In various examples of the present disclosure, creating a revised model structure can include creating a new model structure by crossing and/or combining a plurality of model structures (e.g., two, four, and ten).

Figures 2A, 2B:
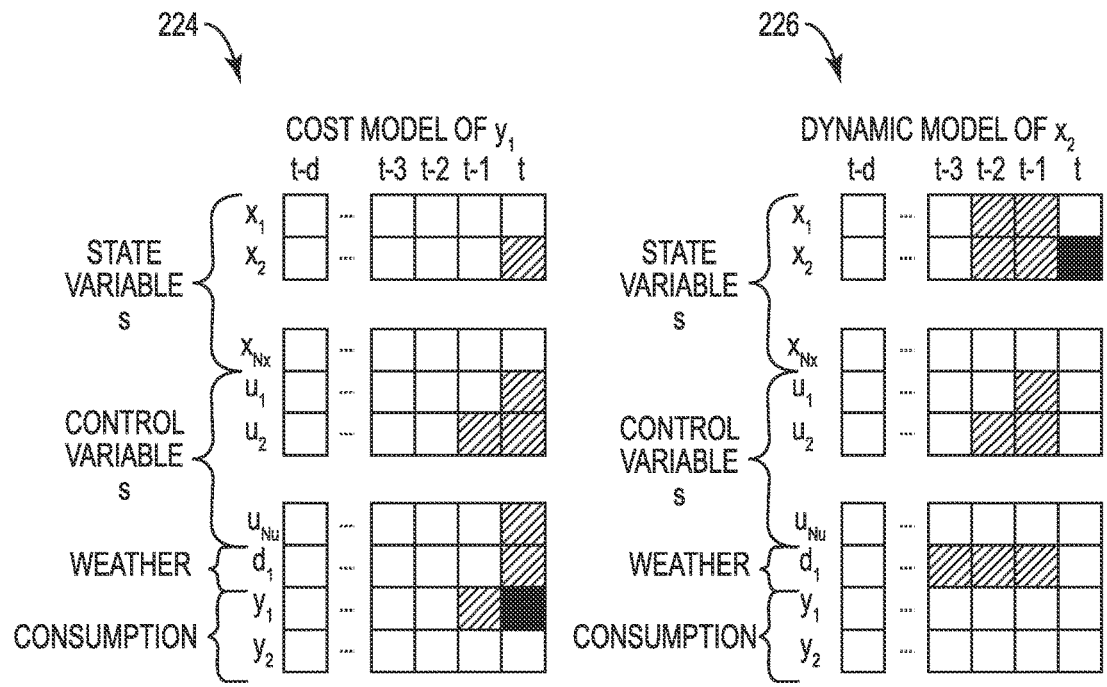
FIGS. 2A-2C illustrate examples of model structures in accordance with one or more embodiments of the present disclosure.
Figure 2C:
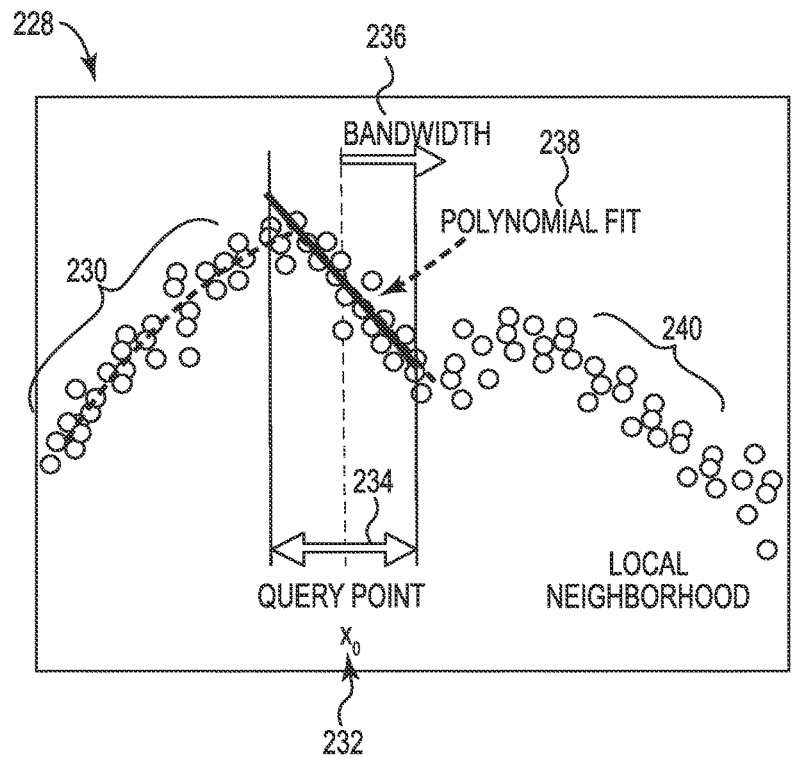

FIGS. 2A-2C illustrate examples of model structures 224, 226, and 228 in accordance with one or more embodiments of the present disclosure.

FIGS. 2A-2B illustrate a graph 224, 226 of the impact of variables on critical variables in accordance with one or more embodiments of the present disclosure. The graphs 224, 226 illustrate, for instance, how a model structure can look.

FIG. 2A illustrates a graph 224 of a critical variable $y_1$ for a cost model. The graph 224 can include a representation of a model structure. The graph 224, for example, can include values for a number of variables $x_1$, $x_2$, $x_{Nx}$, $u_1$, $u_2$, $u_{Nu}$, $d_1$, $y_1$, $y_2$ over a historical period of time t−d, t−3, t−2, t−1, t. Historical times t−d, t−3, t−2, and t−1 can include past times and t can include a current time.

For instance, the graph 224 of a critical variable $y_1$ for a cost model can illustrate the model structure of the cost model. The boxes with hatching can include a number of used variables $x_2$, $u_1$, $u_2$, $u_{Nu}$, $d_1$, $y_1$, that impact the critical variable $y_1$. Each of the used variables $x_2$, $u_1$, $u_2$, $u_{Nu}$, $d_1$, $y_1$ can have an order.

An order of a used variable can include a number of observations (e.g., recent observations) to be made for a used variable. For example, in the embodiment of FIG. 2A, $x_2$, $u_1$, $u_{Nu}$, $d_1$ in the graph 224 have an order of one because one recent observation and/or value (e.g., value of $x_2$, $u_1$, $u_{Nu}$, $d_1$ at t) of the used variables $x_2$, $u_1$, $u_{Nu}$, $d_1$ impacts the critical variable $y_1$. Therefore, one observation is to be made for the used variables $x_2$, $u_1$, $u_{Nu}$, $d_1$ in the cost model. For example, $u_2$ in the graph 224 has an order of two because two recent observations (e.g., $u_2$ at t−1 and t) impact the critical variable $y_1$. Therefore, two observations are to be made for the used variable $u_2$ in the cost model.

Measurement of the number of variables can be taken at each time period (e.g., historical period of time t−d, t−3, t−2, t−1, t). A time period can include ten minutes, one hour, and a day, among many other time periods. The values for the number of variables over the historical period of time −d, t−3, t−2, t−1, t may have an impact on the critical variable $y_1$. For example, the critical variable $y_1$ in the graph 224 can include a dependent variable because the value of the variable $y_1$ at the current time t is impacted by a value of a number of variables $x_2$, $y_2$, $u_1$, $u_2$, $u_{Nu}$, $d_1$.

FIG. 2B illustrates a graph 226 of a critical variable $x_2$ for a dynamic model. The graph 226 can include the same variables as the graph 224 of variable $y_1$. The number of variables can include a number of state variables $x_1$, $x_2$, $x_{Nx}$, a number of control variables $u_1$, $u_2$, and $u_{Nu}$, weather variables $d_1$, and consumption variables $y_1$, $y_2$.

The graph 226 can include a representation of a model structure. The critical variable $x_2$ in the graph 226 can include an independent variable because the value of the variable $x_2$ at the current time t in not effected by any current values of the number of variables in current time t.

For instance, the graph 226 of a critical variable $x_2$ for a dynamic model can illustrate the model structure of the dynamic model. The boxes with hatching can include a number of used variables $x_1$, $x_2$, $u_1$, $u_2$, $d_1$ that impact the critical variable $x_2$. Each of the used variables $x_1$, $x_2$, $u_1$, $u_2$, $d_1$ can have an order. For example, in the embodiment of FIG. 2B, used variable $d_1$ in the graph 226 has an order of three because three recent observations of the used variable $d_1$ (e.g., $d_1$ at t−3, t−2, and t−1) impact the critical variable $x_2$. Therefore, three observations are to be made for the used variable $d_1$ in the dynamic model.

A number of variables, in the graph 226, can impact the critical variable $x_2$. For instance, the value of $x_1$ at time t−1 and t−2 can impact the value of the critical variable $x_2$ at the current time t. The value of $x_2$ at time t−2 and t−1, the value of $u_1$ at t−1, the value if $u_2$ at t−1 and t−2, and the value of $d_1$ at t−1, t−2, and t−3 can impact the value of critical variable $x_2$ at time t.

FIG. 2C illustrates a graph 228 of data of a dynamic system in accordance with one or more embodiments of the present disclosure. The graph 228 can include a local neighborhood bandwidth 240 (e.g., a bandwidth for local regression). A local neighborhood bandwidth 240, for instance, can include a part of a model structure.

The graph 228 of data of a system can include a number of observed variable values 230, a model 238 including a polynomial fit, a bandwidth 236, query point 234, and a local neighborhood bandwidth 240.

Observed variable values 230 can include a number of values for a variable obtained from data measured of the system. Data measured, for example, can include historical data. The observed variables values 230 can occur prior to the current time 232 (e.g., x0). The model 238 can include observed variables and predicted values of the variables, for example.

The query point 234 can include data used to identify a model. Bandwidth 236 can include how much data is involved in the model structure. For instance, a bandwidth can include specific data to be used in the model structure. For instance, a local neighborhood bandwidth 240 can include data which a polynomial fit is made on. Neighborhood bandwidths can include a future bandwidth of data observed. As mentioned above, the local neighborhood bandwidth 240 can be a part of the model structure.

Figure 3:
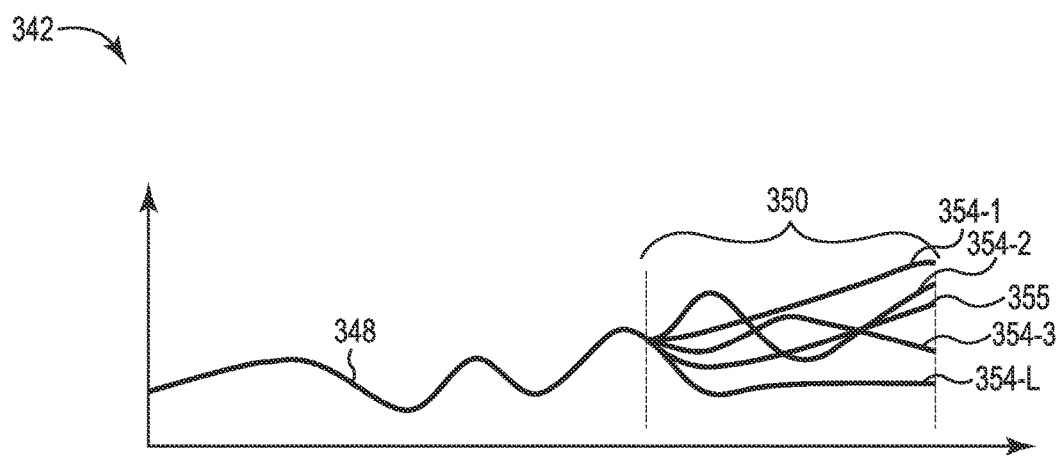
FIG. 3 illustrates a graph of an evaluation of a number of model structures of a dynamic system in accordance with one or more embodiments of the present disclosure.

FIG. 3 illustrates a graph 342 of a evaluation of a number of model structures 354-1, . . . , 354-L in accordance with one or more embodiments of the present disclosure.

The graph 342 can include historical data 348 collected for a number of variables and/or parameters of a dynamic system (e.g., x, y, u, d). The historical data 348, for example, can be used to identify a number of models and/or a number of model parameters.

The graph 342 can include observed values and predicted values 350. For instance, a number of models 354-1, . . . , 354-L each associated with a model structure can be identified from the historical data 348. Values of a number of variables x and y can be predicted with respect to values of a number of known variables d and u (e.g., known inputs). The predicted values of x and y for each of the number of models 354-1, . . . , 354-L can be plotted on the graph 342 in the observed values and predicted values 350 portion of the graph 342.

The predicted values of each of the number of models 354-1, . . . , 354-L can be compared to observed values 355 for the variables x and y. The observed values 355, for example, can include values of variables x and y as observed in a period of time (e.g., ten minutes, one hour, and one day).

Figure 4:
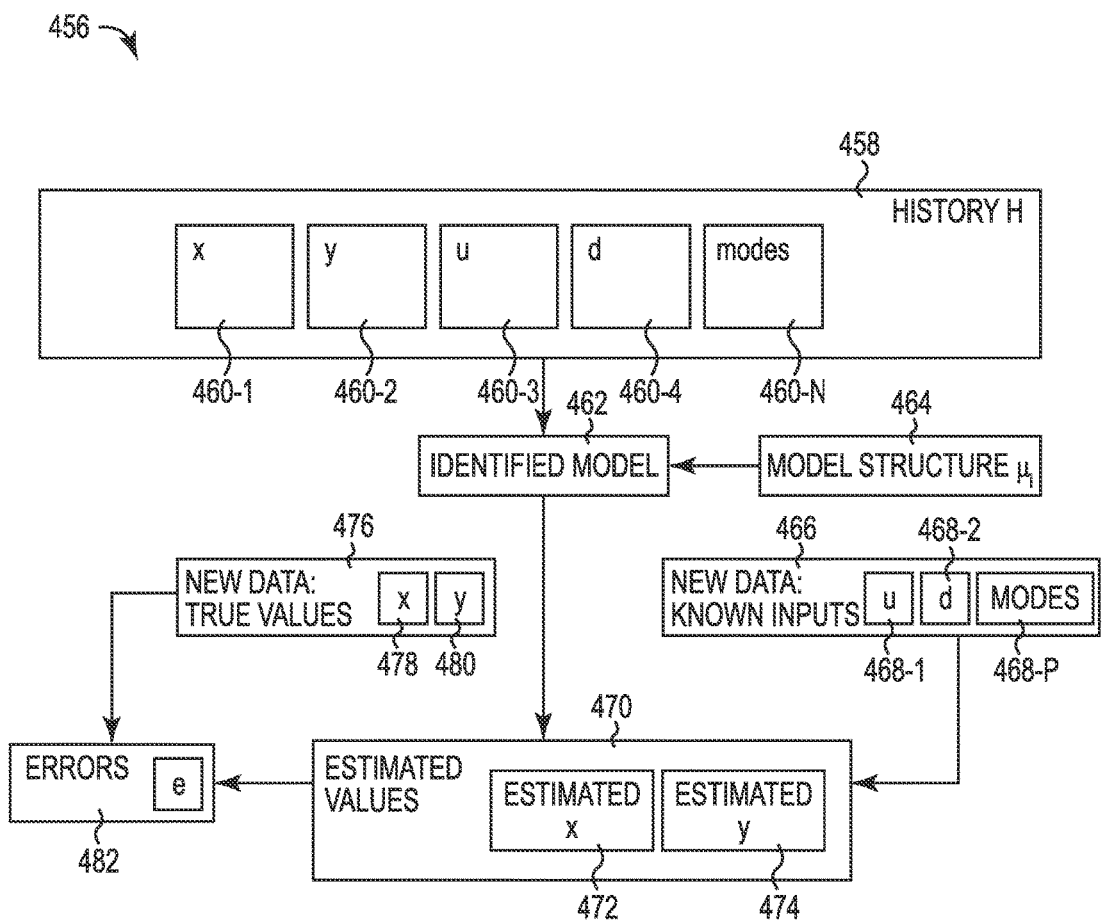
FIG. 4 illustrates a block diagram for evaluating a number of model structures of a dynamic system in accordance with one or more embodiments of the present disclosure.

FIG. 4 illustrates a block diagram 456 for evaluating a number of model structures in accordance with one or more embodiments of the present disclosure.

At 458, historical data H can be received. The historical data H 458 can include a number of variables 460-1, . . . , 460-N. The number of variables 460-1, . . . , 460-N can include a number of independent variables 460-1, a number of dependent variables 460-2, a number of control inputs 460-3, a number of external factors 460-4, and a number of modes 460-N.

The number of independent variables 460-1 and number of dependent variables 460-2 can include a number of variables to be predicted and/or estimated in each of a number of models each associated with a model structure.

An independent variable 460-1 (e.g. x) can include a variable x that is not impacted by other variables (e.g., y, u, d) at the time of observation.

A value of an independent variable at the time of observation may be impacted by other variables at times prior to the time of observation. For example, independent variable x 460-1 may be impacted by the control input u 460-3 value one-hour prior to the observation of x.

A dependent variable 460-2 (e.g., y) can include a variable y that is impacted by other variables at the time of observation.

The number of control inputs 460-3, number of external factors 460-4, and number of modes 460-N can include known variables. The number of control inputs 460-3 (e.g., u) can include a number of variables that can be controlled by the dynamic system. For example, a control input can include a setting associated with components, equipment, and/or properties of a dynamic system. A control input can be a setpoint, for instance. A control input u can include temperature (e.g., heat and/or air-conditioning), electrical requirements to run equipment, and time requirements related to the dynamic system running, among many other control inputs.

The number of external factors 460-4 (e.g., d) can include a number of known variables that may not be controlled by the dynamic system. For example, an external factor 460-4 can include weather and number of people in a building.

The number of modes 460-N can include a number of dynamic system operation settings. For example, a mode can be a status of a device and/or equipment of the dynamic system.

The historical data 458 can be used to identify a model 462. For example, a model structure 464 (e.g., $u_i$) can be associated with a number of models with concrete numeric parameters (e.g., regression coefficients and variables). The historical data 458 can include the concrete numeric parameters (e.g., 460-1 . . . 460-N) of an identified model 462.

Values for a number of variables for the identified model can be estimated 470 using the identified model 462. For instance, a number of independent variables 472 and dependent variables 474 for a future time can be predicted and/or estimated based on the identified model 462 and new data of known inputs 466. For example, the new data of known inputs 466 can include observed values for the control inputs 468-1, external factors 468-2, and modes 468-P for a period of time. The period of time can include period of time (e.g., a bandwidth and one hour) that occurs after the historical data 458 is observed.

The number of predicted and/or estimated values 470 can be compared to new data 476 observed for the number of independent variables 478 and the number of dependent variables 480 to calculate a rate of error 482. The new data 476 can include true values and/or observed values of the number of independent variables 478 and the number of dependent variables 480 for a period of time (e.g., measured data). The period of time for the new data 476 can include a period of time (e.g., one hour) that occurs after the historical data 458 is observed.

Comparing the new data 476 to the estimated values 470 can include calculating a difference between the estimated values 470 (e.g. predicted values) and true values 476 (e.g., observed values). Calculating a difference can include calculating a rate of error 482 of the estimated values 470 as compared to the true values 476.

Figure 5:
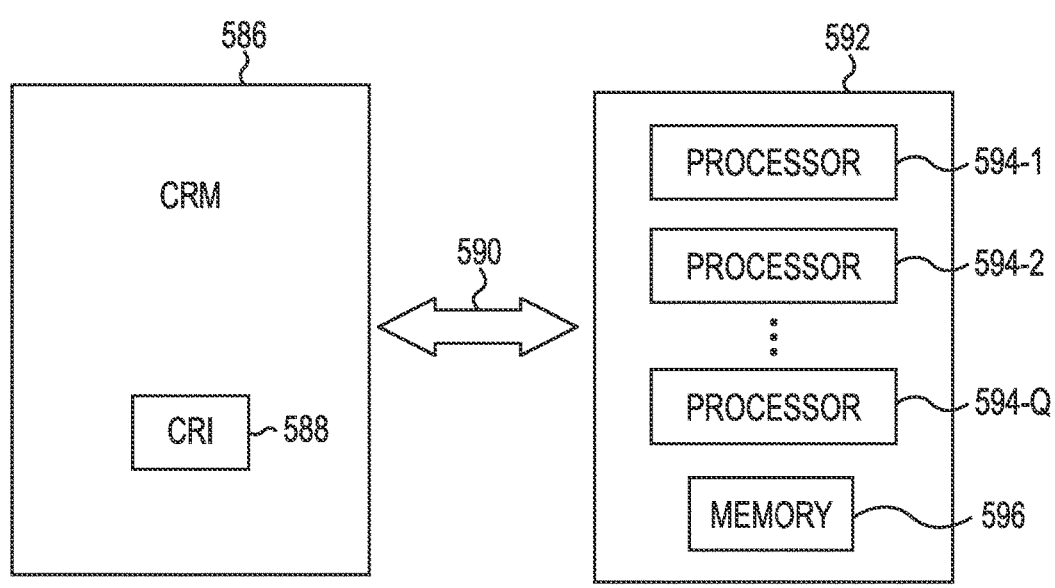
FIG. 5 illustrates a block diagram of an example of a computer-readable medium in communication with processing resources for implementing the tuning of a model structure of a dynamic system in accordance with one or more embodiments of the present disclosure.

FIG. 5 illustrates a block diagram of an example of a computer-readable medium (CRM) 586 in communication with processing resources 594-1, 594-2 . . . 594-Q for implementing tuning model structures of a dynamic system in accordance with one or more embodiments of the present disclosure.

The computing device, as described herein, can also include a CRM 586 in communication with processing resources (e.g., processors 594-1, 594-2 . . . 594-Q). CRM 586 can be in communication with a device 592 (e.g., a Java® application server, among others) having processing resources 594-1, 594-2 . . . 594-Q. The device 592 can be in communication with a tangible non-transitory CRM 586 storing a set of computer-readable instructions (CRI) 588 executable by one or more of the processing resources 594-1, 594-2 . . . 594-Q, as described herein. The CRI 588 can also be stored in remote memory managed by a server and represent an installation package that can be downloaded, installed, and executed. The device 592 can include memory resources 596, and the processing resources 594-1, 594-2 . . . 594-Q can be coupled to the memory resources 596.

Processing resources 594-1, 594-2 . . . 594-Q can execute CRI 588 that can be stored on an internal or external non-transitory CRM 586. The processing resources 594-1, 594-2 . . . 594-Q can execute CRI 586 to perform various functions. For example, the processing resources 594-1, 594-2 . . . 594-Q can execute CRI 588 to identify a model associated with a model structure using data. A non-transitory CRM (e.g., CRM 586), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM 586 can also include distributed storage media. For example, the CRM 586 can be distributed among various locations.

The non-transitory CRM 586 can be integral, or communicatively coupled, to a computing device, in a wired and/or a wireless manner. For example, the non-transitory CRM 586 can be an internal memory, a portable memory, a portable disk, or a memory associated with another computing resource (e.g., enabling CRIs to be transferred and/or executed across a network such as the Internet).

The CRM 586 can be in communication with the processing resources 594-1, 594-2 . . . 594-Q via a communication path 590. The communication path 590 can be local or remote to a machine (e.g., a computer) associated with the processing resources 594-1, 594-2 . . . 594-Q. Examples of a local communication path 590 can include an electronic bus internal to a machine (e.g., a computer) where the CRM 586 is one of volatile, non-volatile, fixed, and/or removable storage medium in communication with the processing resources 594-1, 594-2 . . . 594-Q via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 590 can be such that the CRM 586 is remote from the processing resources e.g., 594-1, 594-2 . . . 594-Q, such as in a network relationship between the CRM 586 and the processing resources (e.g., 594-1, 594-2 . . . 594-Q). That is, the communication path 590 can be a network relationship. Examples of such a network relationship can include a local area network (LAN), wide area network (WAN), personal area network (PAN), and the Internet, among others. In such examples, the CRM 586 can be associated with a first computing device and the processing resources 594-1, 594-2 . . . 594-Q can be associated with a second computing device (e.g., a Java® server, etc.). For example, a processing resource 594-1, 594-2 . . . 594-Q can be in communication with a CRM 586, wherein the CRM 586 includes a set of instructions and wherein the processing resource 594-1, 594-2 . . . 594-Q is designed to carry out the set of instructions to identify a number of models associated with a number of model structures using data.

The processing resources 594-1, 594-2 . . . 594-Q coupled to the memory resource 596 can identify a number of models associated with a number of model structures using data and evaluate the number of model structures. Evaluating each model structure can include instructions to calculate a predicted value for a number of variables in a model associated with a model structure over a period of time, compare the predicted value for the number of variables to an observed value for each of the number of variables over the period of time, and calculate a rate of error for the model structure based on the comparison of the predicted values and the observed values.

The processing resources 594-1, 594-2 . . . 594-Q coupled to the memory resource 596 can identify a best model structure among the number of model structures based on the calculated rate of error for the number of model structures. The processing resources 594-1, 594-2 . . . 594-Q coupled to the memory resource 596 can create a revised model structure using the best model structure, wherein the revised model structure includes a model structure with a calculated rate of error less than the calculated rate of error of the best model structure. Furthermore, the processing resources 594-1, 594-2 . . . 594-Q coupled to the memory resource 596 can update the number of model structures with the revised model structure to tune the number of model structures of the dynamic system.

In accordance with some embodiments of the present disclosure, the processing resources 594-1, 594-2 . . . 594-Q coupled to the memory resource 596 and/or the CRM 586 in communication with the processing resources 594-1, 594-2 . . . 594-Q can be a portion of a supervisory control system. For instance, the system for tuning a model structure of a dynamic system can run adaptively using the Internet.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one.

Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for tuning a data model structure including:
   predicting, using a computing device, a variable for each of a number of models associated with a number of model structures of a dynamic system, wherein each of the number of model structures include a dependency between variables of a model among the number of models;
   calculating, using the computing device, a rate of error of the predicted variable for each of the number of models compared to an observed variable;
   determining, using the computing device, a best model structure and a worst model structure among the number of model structures based on the calculated rate of error;
   creating, using the computing device, a revised model structure using the best model structure by combining a plurality of model structures among the number of model structures;
   tuning the number of model structures of the dynamic system by defining a number of new model structures eligible to be the best model structure and replacing the worst model structure with the revised model structure; and
   controlling, using the computing device, a heating, ventilation, and air-conditioning (HVAC) system by using the best model structure to optimize control variables associated with controllers of the HVAC system.

2. The method of claim 1, wherein creating a revised model structure further includes migrating the best model structure.

3. The method of claim 1, wherein creating a revised model structure further includes migrating a well performing model structure toward the best model structure.

4. The method of claim 1, wherein creating a revised model structure further includes migrating a random model structure towards the best model structure.

5. The method of claim 1, wherein creating a revised model structure further includes creating a new model structure using surrogate modeling including exploration and exploitation.

6. The method of claim 1, further including:
   receiving prioritization of a number of variables from a user; and
   wherein the prioritization is used to calculate the rate of error.

7. The method of claim 1, wherein calculating a rate of error further includes comparing a number of predicted variables to a number of observed variables for each the number of models associated with a number of model structures.

8. The method of claim 7, wherein a model structure further includes a variable among the number of variables that impacts a critical variable.

9. A non-transitory computer-readable medium storing a set of instructions executable by a processor to cause a computer to:
   identify a number of models associated with a number of model structures of a dynamic system using data, wherein the number of model structures include dependencies between a number of variables for each of the number of models, including:
   a linear dependency; and
   a bandwidth for regression;
   predict a value for each of the number of variables for each of the number of models;
   calculate a rate of error for each of the number of models including comparing the predicted value for the number of variables to an observed value for the number of variables for each of the number of models;
   compare the calculated rate of error to determine a best model structure among the number of model structures and a worst model structure among the number of model structures;
   update the number of model structures with a revised model structure using the best model structure by combining a plurality of model structures among the number of model structures;
   tune the number of model structures of the dynamic system by defining a number of new model structures eligible to be the best model structure and replacing the worst model structure with the revised model structure; and
   control a heating, ventilation, and air-conditioning (HVAC) system by using the best model structure to optimize control variables associated with controllers of the HVAC system.

10. The medium of claim 9, wherein the instructions are further executable to save a number of immature model structures.

11. The medium of claim 9, wherein a number of immature model structures includes a number of model structures with less than a threshold number of evaluations.

12. The medium of claim 9, wherein the instructions are further executable to update the calculated rates of errors of the number of model structures of the dynamic system over time.

13. A system for tuning a model structure of a dynamic system, the system comprising a processing resource in communication with a non-transitory computer readable medium, wherein the non-transitory computer readable medium includes a set of instructions and wherein the processing resource is designed to carry out the set of instructions to:
   identify a number of models associated with a number of model structures using data, wherein the number of model structures include dependencies between a number of variables for each of the number of models, including:
   a linear dependency; and
   a bandwidth for regression;
   evaluate the number of model structures, wherein evaluating each model structure includes:

calculate a predicted value for the number of variables in a model associated with a model structure over a time period;

compare the predicted value for the number of variables to an observed value for each of the number of variables over the time period; and calculate a rate of error for the model structure based on the comparison of the predicted values and the observed values;

identify a best model structure and a worst model structure based on the calculated rate of error for the number of model structures;

create a revised model structure using the best model structure by combining a plurality of model structures among the number of model structures, wherein the revised model structure includes a model structure with a calculated rate of error less than the calculated rate of error of the best model structure;

update the number of model structures with the revised model structure to tune the number of model structures of the dynamic system by defining a number of new model structures eligible to be the best model structure and replacing the worst model structure with the revised model structure; and control a heating, ventilation, and air-conditioning (HVAC) system by using the best model structure to optimize control variables associated with controllers of the HVAC system.

14. The system of claim 13, wherein the system is a portion of a supervisory control system and the system runs adaptively using the Internet.

15. The system of claim 13, wherein the worst model structure includes a model structure with a higher calculated rate of error than the remaining number of model structures.

16. The system of claim 13, wherein the worst model structure includes a model structure with less than a threshold number of evaluations.

17. The system of claim 13, wherein the processing unit is designed to further carry out the set of instructions to save a threshold number of well performing model structures.

18. The system of claim 17, wherein the threshold number of well performing model structures include a number of model structures with a lower calculated rate of error than the remaining number of model structures.

* * * * *